(No Model.) 2 Sheets—Sheet 1.

G. EASTMAN.
CAMERA SHUTTER.

No. 486,397. Patented Nov. 15, 1892.

WITNESSES:
Thomas Durant
Aly S Stewart

INVENTOR
George Eastman
BY
Church & Church
his ATTORNEYS (No Model.) 2 Sheets—Sheet 2.

G. EASTMAN.
CAMERA SHUTTER.

No. 486,397. Patented Nov. 15, 1892.

WITNESSES:
Thomas Durant
Aly. S. Stewart

INVENTOR
George Eastman
BY
Church & Church
his ATTORNEYS.

THE NORRIS PETERS CO., PHOTO-LITHO., WASHINGTON, D. C.

UNITED STATES PATENT OFFICE.

GEORGE EASTMAN, OF ROCHESTER, NEW YORK, ASSIGNOR, BY MESNE ASSIGNMENTS, TO THE EASTMAN KODAK COMPANY, OF SAME PLACE.

CAMERA-SHUTTER.

SPECIFICATION forming part of Letters Patent No. 486,397, dated November 15, 1892.

Application filed February 10, 1892. Serial No. 420,978. (No model.)

*To all whom it may concern:*

Be it known that I, GEORGE EASTMAN, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My present invention has for its object to provide an improved photographic shutter of the class usually employed in cameras using photographic film or plates where it is desirable to keep the exposing-aperture of the shutter closed while it is moving in one direction, so that the shutter may be set without liability of accidentally exposing the plate or film; and it has, further, for its objects to provide a shutter that is simple in construction, not liable to get out of order, and can be made at a nominal cost; and to these and other ends the invention consists in certain improvements in construction and combinations of parts, all as will be hereinafter fully described, and the novel features pointed out particularly in the claims at the end of this specification.

Figure 1:
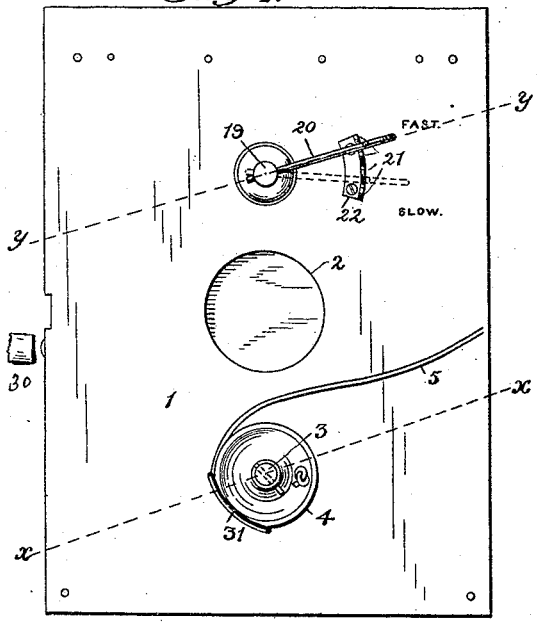
Figure 2:
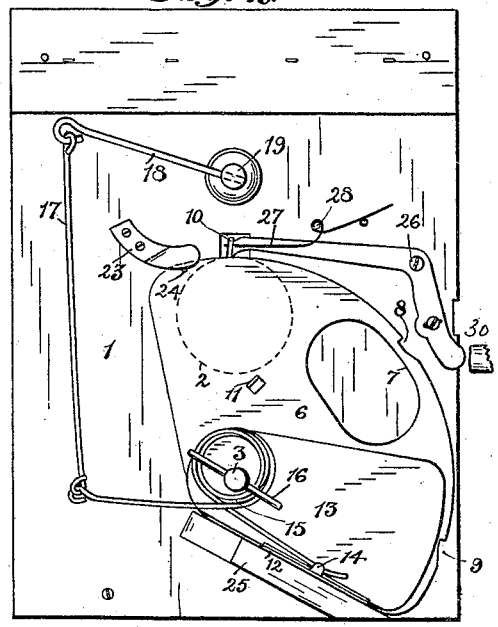
Figure 3:
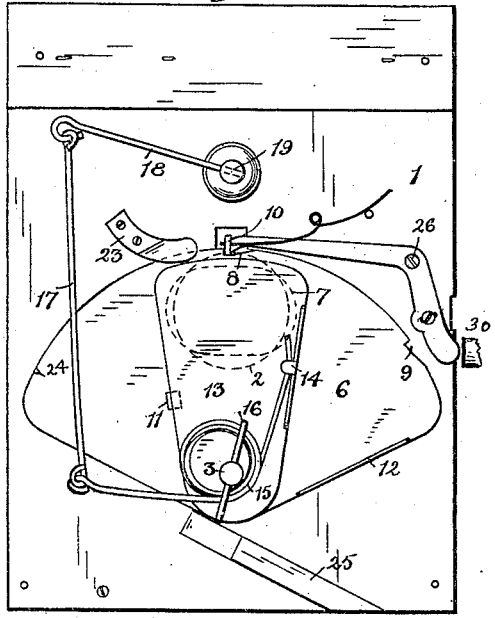
Figure 4:
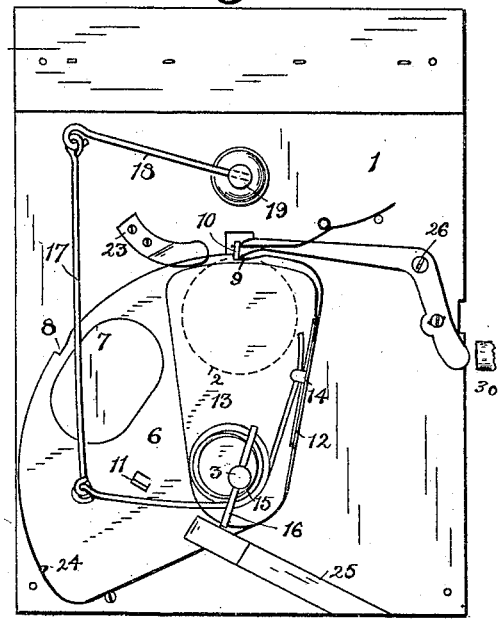
Figure 5:
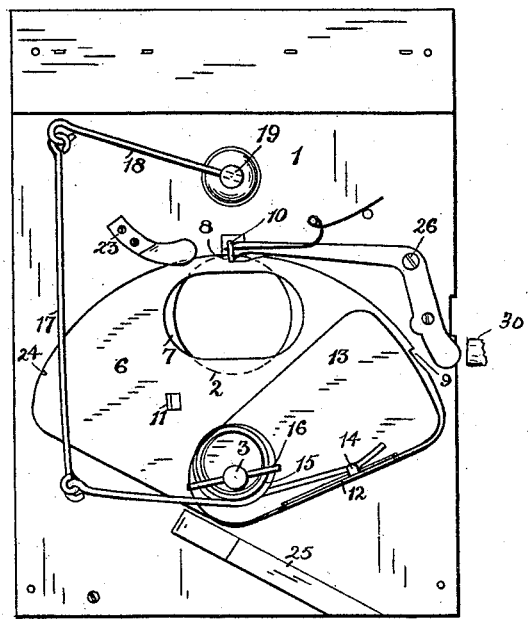
Figure 6:
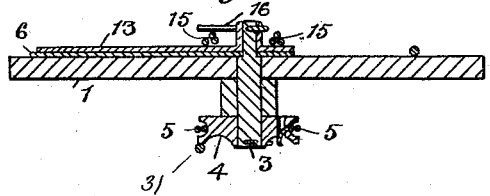
Figure 7:
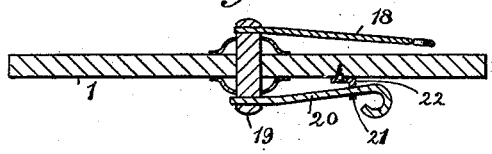

In the accompanying drawings, Figure 1 is a front view of the board or support on which the shutter is mounted; Fig. 2, a rear view of the same; Fig. 3, a similar view showing the operation of setting the shutter; Fig. 4, a view showing the shutter set for instantaneous exposure; Fig. 5, a similar view showing the shutter set for time-exposure; Fig. 6, a sectional view on the line $x$ $x$ of Fig. 1; Fig. 7, a sectional view on the line $y$ $y$ of Fig. 1.

Similar reference-numerals in the several figures indicate similar parts.

1 indicates the front board or shutter-support, provided with the usual opening 2, over which the lens is secured in the usual manner, and passing through said support is an arbor or shaft 3, to the outer end of which is rigidly connected a grooved pulley 4, to which is secured one end of a cord 5, extending at one side and serving as a means for setting the shutter. Journaled loosely upon this arbor is the main shutter 6, having the usual exposing-aperture 7 and provided on its periphery with notches 8 and 9, the former being so located relative to a pivoted catch 10 that when the latter is engaged with the notch 9 the shutter-aperture 7 will be in line with the lens-opening. Formed upon the shutter at one side of the aperture is a projection or shoulder 11, preferably formed by turning up a tongue of the metal of which the shutter is composed, and at the side of the shutter is formed a flange or stop 12, also formed by turning up an edge of the shutter. Secured rigidly to the inner end of the arbor is an auxiliary or cover shutter 13, sufficiently large to cover the aperture 7 of the main shutter and provided at one edge with the flange or tongue 14, under which projects one end of a spring 15, preferably coiled around the arbor 3 and prevented from outward movement by a pin 16, secured thereto. The other end of said spring is connected by link 17 with the end of an arm 18, fastened to an arbor 19, passing through the support, the front end of said arbor having secured to it a spring-arm 20, arranged to co-operate with the teeth 21, formed on the angular plate 22, secured to the support 1, and by lifting said arm 20 it can be adjusted in one or the other of the teeth of the plate, thereby adjusting the tension of the spring 15, as will be readily understood.

Secured to the support 1 is a small plate 23, slightly overlapping the edge of the shutter 6 and forming a guide for the latter and also co-operating, when the shutter is near the end of its stroke when making an exposure, with a slight projection 24, formed on the shutter and serving in a measure as an elastic stop or brake. The movement of the main shutter when thrown is arrested by a stop 25, composed, preferably, of a piece of wood secured in a slot formed in the support 1 and having a large surface bearing on the shutter, as shown.

10 indicates a catch, formed of a piece of sheet metal, pivoted at 26 to the support, having its end bent outward in position to engage the notches in the edge of the main shutter, said catch being forced into engagement with the shutter by a spring 27, coiled around pin 28, one end engaging the catch while the other is engaged with the pin 40, the end of the catch 10 projecting slightly beyond the edge of the support 1 in the present instance, so that it may be acted upon by a pin 30, operated from the exterior of the camera-casing or otherwise, as may be desired.

As in the present construction the pulley 4 on the end of the arbor is slightly removed from the face of the support 1, I provide a guard 31, composed of a staple-shaped piece of wire arranged with its two legs in contact or in close proximity to the pulley, so that the cord will not escape from the groove or be liable to be displaced after the shutter is set.

The operation of the device will now be described. When it is desired to set the shutter, the operator pulls the cord outward, rotating the arbor 3, and with it the auxiliary shutter, which is first moved against the tension of the spring, so as to cover the opening in the main shutter and engage the projection 11 thereon. The continued movement carries both the main and auxiliary shutters, the former with the aperture covered around to the position shown in Fig. 4, when the catch 10 will engage the notch 9 and retain the main shutter, and when the cord is relaxed the spring will throw the auxiliary shutter back to the position shown in Fig. 4, in engagement with the stop or flange 12 of the main shutter, the spring being under tension and the aperture in the main shutter being uncovered. By pressing on the end of the catch 10 the shutter will be released and the spring will cause it to return to first position against the stop 25, the exposure being made when the exposing-aperture passes the lens-opening. When it is desired to make a me-exposure, the cord is pulled and the shutter is rotated, as before, until the aperture 7 is in line with the lens-opening, which will be denoted by the click caused by the catch dropping into the notch 8, and the tension on the cord is released when the auxiliary shutter will be returned out of the way against the flange of the main shutter, and the exposure may then be caused by a cap in the ordinary manner. The tension of the spring can be readily adjusted by engaging the arm 20 with the various teeth of the plate 22 22 22, as will be readily understood.

This shutter is very simple, is not liable to get out of order, and can be made at almost a nominal cost, the parts being readily stamped out of sheet metal and assembled by an unskilled operator, and the feature of extending a single arbor through the support and mounting the shutter upon it simplifies the structure greatly.

I claim as my invention—

1. The combination, with the shutter-support and an oscillatory arbor journaled in said support, of an exposing-shutter journaled loosely on the arbor, an auxiliary shutter secured rigidly to the arbor, a catch for engaging the exposing-shutter, a spring for moving the arbor in one direction, and a stop on the exposing-shutter, with which the auxiliary shutter co-operates to cover the exposing-aperture when moved in one direction, substantially as described.

2. The combination, with the shutter-support and an oscillatory arbor journaled therein, of an exposing-shutter journaled loosely on the arbor, an auxiliary shutter secured rigidly to the arbor, stops on the main shutter, with which the auxiliary shutter co-operates, a catch engaging the exposing-shutter, an adjustable arm on the shutter-support, and a spring connected at one end to said arm and at the other to the arbor, substantially as described.

3. The combination, with the shutter-support and an arbor journaled therein, of an exposing-shutter journaled on the arbor, an auxiliary shutter rigidly secured to the arbor, co-operating with stops on the main shutter, a catch engaging the exposing-shutter, a second arbor journaled in the support having two arms, a notched plate with which one of said arms engages, and a spring connected to the other of said arms and to the arbor, substantially as described.

4. The combination, with the support, the arbor journaled therein having the grooved pulley, the cord connected thereto, and the cord-guard 31, arranged in proximity to said pulley, of the shutter connected to the arbor and operated thereby, substantially as described.

5. The combination, with the shutter-support and an arbor journaled therein, of an exposing-shutter journaled loosely on the arbor, an auxiliary shutter secured rigidly to the arbor co-operating with stops on the main shutter, a catch engaging the exposing-shutter, an adjustable arm on the support, a spring connected to said arm at one end, passing around the arbor and engaging the auxiliary shutter, and the pin on the end of the arbor for preventing the displacement of the coils of the spring, substantially as described.

6. The combination, with the shutter-support and an arbor extending through the support and having the pulley at one end for moving it in one direction, of an exposing-shutter journaled loosely on the arbor near the other end, an auxiliary shutter secured rigidly to the arbor, a catch for engaging the exposing-shutter, a spring for moving the arbor in one direction, and a stop on the exposing-shutter, with which the auxiliary shutter co-operates to cover the exposing-aperture when moved in one direction, substantially as described.

GEO. EASTMAN.

Witnesses:
FRED F. CHURCH,
GRACE A. RODA.